Feb. 2, 1926.  
G. W. WILSON  
1,571,748  
AXLE AND WHEEL STRUCTURE  
Filed Oct. 20, 1924    2 Sheets-Sheet 2

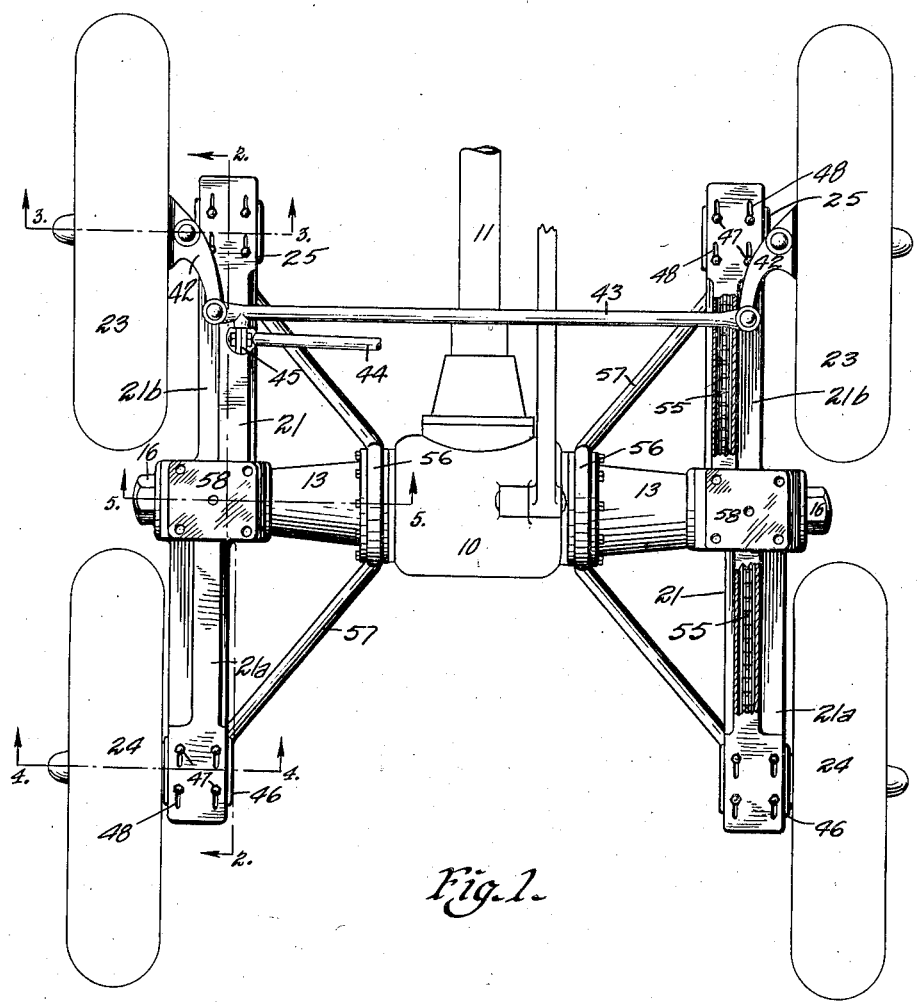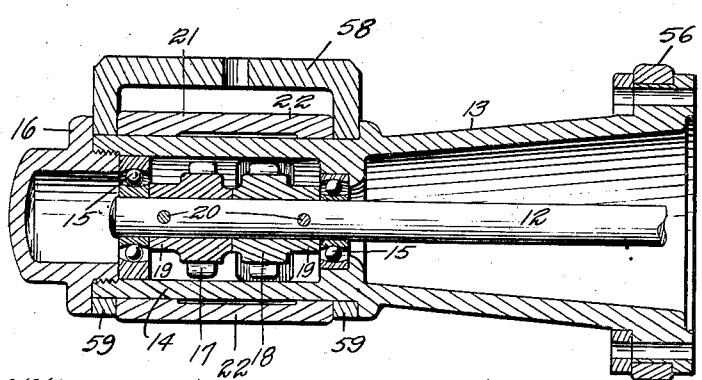

Witness  
R. H. Fisher

Inventor  
George W. Wilson  
by Bair & Freeman Attorneys

Patented Feb. 2, 1926.

1,571,748

UNITED STATES PATENT OFFICE.

GEORGE W. WILSON, OF HENDERSON, IOWA.

AXLE AND WHEEL STRUCTURE.

Application filed October 20, 1924. Serial No. 744,636.

*To all whom it may concern:*

Be it known that I, GEORGE W. WILSON, a citizen of the United States, and a resident of Henderson, in the county of Mills and State of Iowa, have invented a certain new and useful Axle and Wheel Structure, of which the following is a specification.

My invention relates to axle and wheel structures for motor vehicles.

More particularly, it is my purpose to provide an axle and wheel structure of the type in which four wheels are used at the rear end of the vehicle.

It is my object to provide a structure of the general type mentioned of simple, durable and relatively inexpensive construction.

It is my special purpose to provide such a structure in which a single axle is supported upon four wheels in such manner that the support and the wheels at each end of the axle may have tilting movement with relation to the axle.

Another purpose is to provide such a structure in which one pair of wheels is steerable.

In general, it is my object to provide a structure of the kind hereinbefore mentioned and having special parts and mechanism for connecting them, embodying novel features of construction.

With these and other objects in view, my invention consists in the construction, arrangement and combination of the various parts of my axle and wheel structure, in which the objects contemplated are attained, as hereinafter more fully set forth, pointed out in my claims, and illustrated in the accompanying drawings, in which:

Figure 1 is a top or plan view of an axle and wheel structure embodying my invention.

Figure 5 is a transverse, vertical, sectional view taken on the line 5—5 of Figure 1.

Figure 2:
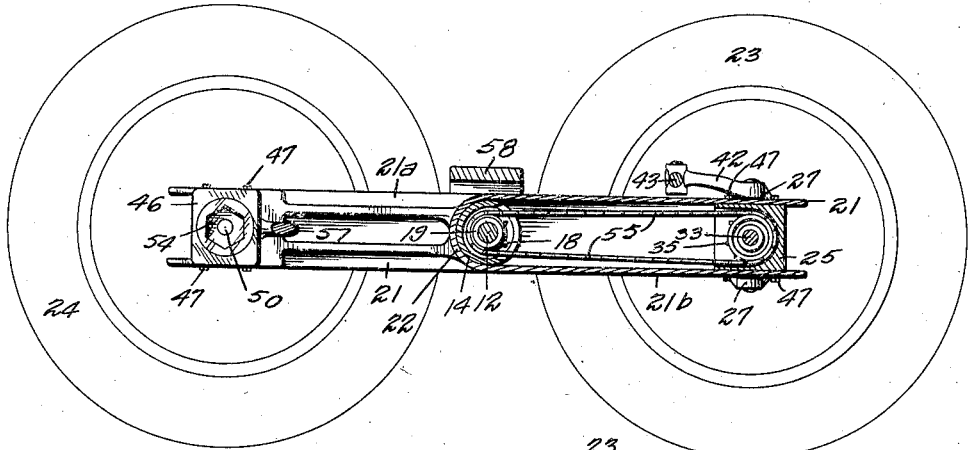
Figure 2 is a detail, vertical, sectional view taken on the line 2—2 of Figure 1.

It is known that experiments and experience have demonstrated the desirability of using four wheels for heavy trucks, busses and the like for affording better traction and reducing the wear on the road. Such structures heretofore have had certain disadvantages.

Among these disadvantages was the use of two axles, which made the structures expensive and very heavy. Another disadvantage arose from the fact that in turning corners, one of the rear pairs of wheels was obliged to slide or skid on the road. Another disadvantage arose from the vibration transmitted from the wheels to the axle, the chassis and the body of the vehicle.

It is my purpose to provide a structure having the advantages of lessening the ground friction and increasing traction over the two-wheel type, and which eliminates the dual axle construction, and the undesirable skidding feature above mentioned, and which greatly reduces the vibration transmitted from the wheels to the axle and the chassis and body of the vehicle.

For accomplishing this purpose, I have mounted the four wheels on a single axle in the peculiar manner hereinafter described.

In the accompanying drawings, I have used the reference numeral 10 to indicate generally a differential, the particular structure of which forms no part of my present invention. The differential is connected in any suitable way with the drive shaft 11.

The axle members 12 extending laterally from the differential are received within suitable housings 13. At the outer end of each housing member 13 is a cylindrical portion 14, which is large enough to receive the sprockets hereinafter referred to. Each axle member 12 is journaled in the cylindrical portion 14 of the housing 13 by means of laterally spaced ball bearing structures 15, as illustrated in Figure 5. On the end of each portion 14 is a suitable hub cap or the like 16.

Mounted on each axle member 12 within the compartment formed by the housing portion 14 and between the pairs of ball bearing devices 15 is a pair of sprockets 17 and 18. Each sprocket has a hub 19 fixed to the axle member 12, as for instance by means of the pins 20.

A wheel support 21 is journaled on each housing portion 14 and extends both rearwardly and forwardly therefrom and is designed to rock thereon so as to have free tilting movement on the axle housing.

The rearwardly projecting part 21ª of the support 21 is slightly offset laterally with relation to the forwardly projecting part 21ᵇ of the same support. The central portion of each support 21 forms a journal 22 for the housing portion 14.

In the form of my invention herein illustrated, the front pair of wheels 23 is steerable and the rear pair of wheels 24 is not.

I will now describe the method of mounting the front wheels in the support 21.

Mounted in the support 21 at the forward end thereof is a hollow block or the like 25 having laterally projecting upper and lower portions 26. A yoke 27 is pivoted for horizontal swinging movement on the block 25 by means of pins or the like 28 in the arms of the yoke 27 and the portions 26.

The yoke 27 has formed thereon a hollow spindle 29 upon which the hub 30 is journaled by means of ball bearing structures 31 or the like.

Journaled in the block 25 by means of ball bearing structures 32 is a short shaft 33, which may project inwardly through the movable end 34 of the block 25 to receive a brake mechanism or the like, if desired.

The removable end member 34 is screwed into the block 25. Fixed to the shaft 33 is a sprocket 35 aligned with one of the sprockets 18.

Figure 3:
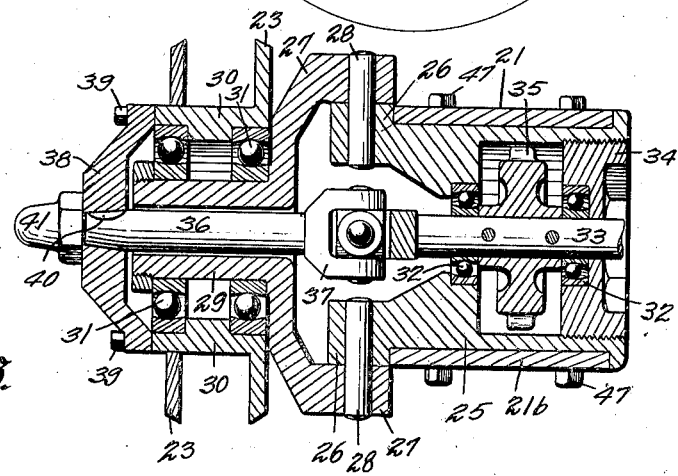
Figure 3 is a detail, sectional view taken on the line 3—3 of Figure 1.

Extending through the hollow spindle 29 is a stub shaft 36 connected by means of a universal joint 37 with the shaft 33. The universal joint 37 is arranged in a vertical line with the pins 28, as shown in Figure 3.

A hub cap 38 is rigidly secured by bolts 39 to the hub 30. The cap 38 is fixed as by a key 40 to the stub shaft 36. On the end of the shaft 36 is a nut 41. Short arms 42 extend away from the members 27 and are connected by a tie rod 43 pivoted thereto.

A steering gear connecting rod 44 may be connected with the tie rod 43 by a ball and socket joint 45.

The rear wheels 24 are mounted on the rear ends of the portions 21ª of the supports 21 in a manner similar to that of mounting the front pair of wheels with the omission of the parts necessary to make the front wheels steerable.

Figure 4:
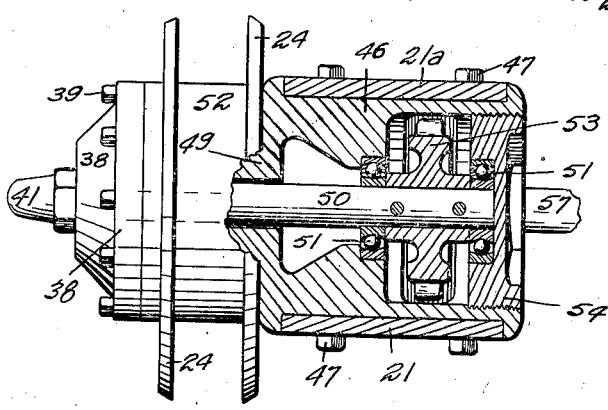
Figure 4 is a detail, sectional view taken on the line 4—4 of Figure 1, part of the wheel structure being in elevation.

As shown in Figure 4, a block 46 is mounted in the rear end of the portion 21ª of the support 21. The blocks 25 and 46 are preferably locked in place by means of screw bolts 47 extended through longitudinally elongated slots 48 in the supports 21 (see Figure 1) and screwed into the blocks.

On one end of the block 46 is a hollow spindle 49 similar to the spindle 29. A shaft 50 is journaled in the block 46 by ball bearings 51 and projects through the hollow spindle 49. The hub 52 of the wheels 24 is journaled on the spindle 49 in the manner illustrated by the mounting of the wheels 23 on the spindle 29.

A hub cap 38 similar to that already described is fixed to the hub 52 by bolts 39 and is also fixed to the shaft 50. A nut 41 similar to that above referred to is screwed on the end of the shaft 50. A sprocket 53 is fixed to the shaft 50 within the block 46.

The block 46 has the removable end 54 screwed thereinto, as shown in Figure 4.

If it is not desired to use brakes connected with the wheel shafts, then the shafts may abut against the removable end members as illustrated by the shaft 50 and the end member 54 in Figure 4.

On the aligned sprockets 18 and 35, and on the aligned sprockets 17 and 53 are sprocket chains 55, as shown in Figures 1 and 2.

On the housings 13 adjacent to the differential 10 may be mounted bands or clamps 56. Radius rods 57 are preferably connected with the bands 56 and with the supports 21 near their ends. The bands 56 may rotate on the housings 13.

Above the journal portions 22 at the middle of the supports 21 are spring pads 58, which are mounted on the housing portions 14 by bands or clamps 59 (see Figure 5).

It will be seen from the foregoing description that I have provided a wheel and axle structure embodying only one main axle, having two pairs of supporting wheels mounted thereon.

The pairs of wheels on each side of the vehicle and the supporting means therefor are so arranged that the supports 21 may tilt substantially. The gearing connections are such, however, that rotation is imparted from the rear axle shaft members 12 to the wheels without difficulty regardless of the tilting positions of the supports 21 and the wheels.

This arrangement with a single axle and two pairs of wheels mounted respectively in front of and behind the main axle has many advantages.

The material and weight of my structure are, of course, much less than the material and weight employed where two separate axles are used.

More important even, however, are the advantages arising from the mounting of the wheels on the supports 21, so that the rear and front wheels may rise or drop down with the tilting movement of the support 21.

It is thus seen that if the wheels 23 for instance drop down an inch or are raised an inch in road travel, only half an inch of movement would be transmitted to the main axle. This is, of course, a valuable feature of the structure herein disclosed and reduces greatly the vibration on the rear axle structure.

My device, of course, has all the advantages of any structure employing four rear wheels in that it affords greater traction grip on the ground, and greatly lessens road wear and the wear on the machine is also greatly reduced.

By providing the steerable front wheels 23 of the four rear wheels, it is made possible for the wheels 23 to travel on the proper circles without the necessity for the skidding of any of the wheels in making a turn. This is a matter of great importance in the wear on the wheels or tires.

The whole structure is of very simple construction and is much cheaper than the ordinary structure using four rear wheels.

It will be noted that the support 21 forms casings for the gearing mechanisms including the chains 55.

It will be noted that the wheels have slight longitudinal adjustment on account of the use of the bolts 47 and slots 48. It will also be noted that I have provided a very simple mechanism disclosed in Figure 3 for giving to the front wheels 23 steerability.

Some changes may be made in the details of the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. In a wheel and axle structure, a differential and axle housing, a differential and two-part axle mounted therein, wheel supports mounted on the opposite ends of said housing and having parts extending in one direction from the housing and non-aligned parts extending in the other direction from the housing forming casings, a pair of wheels journaled on those projecting parts of the wheel supports which form the pair most widely separated, a pair of wheels steerably mounted on the other projecting members of said wheel supports in alignment with the wheels of the first pair, means for imparting motion from the axle to the first pair of wheels, and means for imparting motion from the axle to the second pair of wheels.

2. In a wheel and axle structure, a differential and axle housing, a differential and two-part axle mounted therein, wheel supports mounted on the opposite ends of said housing and having parts extending in one direction from the housing and non-aligned parts extending in the other direction from the housing forming casings, a pair of wheels journaled on those projecting parts of the wheel supports which form the pair most widely separated, a pair of wheels steerably mounted on the other projecting members of said wheel supports in alignment with the wheels of the first pair, means for imparting motion from the axle to the first pair of wheels, and means for imparting motion from the axle to the second pair of wheels in all the tilted positions of the respective pairs of wheels with relation to the housing structure.

3. In a wheel and axle structure, a differential and axle housing, a differential and two-part axle mounted therein, wheel supports mounted on the opposite ends of said housing and having parts extending in one direction from the housing and non-aligned parts extending in the other direction from the housing forming casings, a pair of wheels journaled on those projecting parts of the wheel supports which form the pair most widely separated, a pair of wheels steerably mounted on the other projecting members of said wheel supports in alignment with the wheels of the first part, means for imparting motion from the axle to the first pair of wheels, means for imparting motion from the axle to the second pair of wheels, radius rods secured to the respective wheel supports near their ends and inclined inwardly and to the differential and axle housing and having a rotary mounting on such housing at their inner ends.

Des Moines, Iowa, October 9, 1924.

GEORGE W. WILSON.